US011630208B2

(12) United States Patent
Nishita et al.

(10) Patent No.: US 11,630,208 B2
(45) Date of Patent: Apr. 18, 2023

(54) MEASUREMENT SYSTEM, MEASUREMENT METHOD, AND MEASUREMENT PROGRAM

(71) Applicant: Topcon Corporation, Tokyo (JP)

(72) Inventors: Nobuyuki Nishita, Hadano (JP); Tetsuji Anai, Tsurugashima (JP)

(73) Assignee: Topcon Corporation, Tokyo (JP)

( * ) Notice: Subject to any disclaimer, the term of this patent is extended or adjusted under 35 U.S.C. 154(b) by 442 days.

(21) Appl. No.: 15/930,462

(22) Filed: May 13, 2020

(65) Prior Publication Data

US 2020/0363530 A1 Nov. 19, 2020

(30) Foreign Application Priority Data

May 15, 2019 (JP) .............................. JP2019-092396

(51) Int. Cl.
*G01S 17/89* (2020.01)
*G01S 7/51* (2006.01)
*G01S 7/481* (2006.01)
*G01S 17/42* (2006.01)

(52) U.S. Cl.
CPC ............ *G01S 17/89* (2013.01); *G01S 7/4817* (2013.01); *G01S 7/51* (2013.01); *G01S 17/42* (2013.01)

(58) Field of Classification Search
CPC .......... G01S 17/89; G01S 7/4817; G01S 7/51; G01S 17/42; G01S 17/86; G01C 15/002
USPC .......................... 340/4.36; 356/4.01; 345/632
See application file for complete search history.

(56) References Cited

U.S. PATENT DOCUMENTS

| 5,694,203 A | * | 12/1997 | Ogawa | G01C 3/08 |
| | | | | 348/31 |
| 6,330,523 B1 | * | 12/2001 | Kacyra | G01B 11/002 |
| | | | | 703/2 |
| 6,420,698 B1 | * | 7/2002 | Dimsdale | G01C 15/002 |
| | | | | 250/234 |

(Continued)

FOREIGN PATENT DOCUMENTS

JP 2005-213972 A 8/2005

OTHER PUBLICATIONS

JP2003279333—Shape measuring apparatus, appearance examining apparatus, dimension examining apparatus, volume examining apparatus and displacement and deformation measuring apparatus by Iwata Akihiro, Toshiba Engineering Company, (Oct. 2, 2003), p. 1 to 10. (Year: 2003).*

*Primary Examiner* — Nam V Nguyen
(74) *Attorney, Agent, or Firm* — Chiesa, Shahinian & Giantomasi PC

(57) ABSTRACT

A measurement system includes: a storage configured to store design information including at least a dimension and a designed position of each of building components at a construction site; a component identifier configured to identify at least one of the building components constructed at the construction site as an identified building component, based on the designed position stored in the storage; a scanner configured to measure a distance and/or angle from the identified building component identified by the component identifier; a point cloud data generator configured to generate three-dimensional point cloud data, based on a result of the distance and/or angle measured by the scanner; and an actually measured position calculator configured to calculate an actually measured position of the identified building component, based on the three-dimensional point cloud data.

14 Claims, 8 Drawing Sheets

(56) References Cited

U.S. PATENT DOCUMENTS

| | | | |
|---|---|---|---|
| 6,922,234 B2* | 7/2005 | Hoffman | G01C 11/025 |
| | | | 702/159 |
| 7,230,724 B2* | 6/2007 | Jokinen | G01S 7/4811 |
| | | | 250/559.22 |
| 8,503,046 B2* | 8/2013 | Mikkelsen | G02B 26/0891 |
| | | | 358/475 |
| 9,025,861 B2* | 5/2015 | Furukawa | G06T 17/00 |
| | | | 382/281 |
| 9,134,339 B2* | 9/2015 | Becker | G01P 15/00 |
| 10,504,294 B2* | 12/2019 | Bare | G06T 15/205 |
| 10,613,200 B2* | 4/2020 | Hallstig | G01S 17/931 |
| 10,767,991 B2* | 9/2020 | Ohtomo | G06T 5/50 |
| 10,809,360 B2* | 10/2020 | Ohtomo | G01S 17/89 |
| 10,816,939 B1* | 10/2020 | Coleman | G01S 17/86 |
| 11,035,667 B2* | 6/2021 | Halahmi | E04F 21/08 |
| 11,035,955 B2* | 6/2021 | Zweigle | G09B 29/004 |
| 11,181,639 B2* | 11/2021 | Morita | G01S 17/42 |
| 11,184,967 B2* | 11/2021 | Coleman | G01S 7/497 |
| 2005/0275824 A1* | 12/2005 | Ohtomo | G01C 15/002 |
| | | | 356/4.03 |
| 2008/0075326 A1* | 3/2008 | Otani | G01C 3/00 |
| | | | 382/106 |
| 2013/0096873 A1* | 4/2013 | Rosengaus | G01C 15/002 |
| | | | 702/155 |
| 2015/0170258 A1* | 6/2015 | Kulig | G06Q 30/0603 |
| | | | 705/26.9 |
| 2017/0211937 A1* | 7/2017 | Hu | G01S 5/0289 |
| 2018/0012125 A1* | 1/2018 | Ladha | G01S 17/89 |
| 2020/0065432 A1* | 2/2020 | Möller | G01C 1/04 |

\* cited by examiner

MEASUREMENT SYSTEM, MEASUREMENT METHOD, AND MEASUREMENT PROGRAM

CROSS-REFERENCE TO RELATED APPLICATIONS

This application claims priority to Japanese Patent Application No. 2019-092396 filed on May 15, 2019, the entire disclosure of which is incorporated by reference herein.

BACKGROUND

The present disclosure relates to a measurement system and a measurement method, both for measuring mainly a building component constructed at a construction site, and a storage medium storing a measurement program for measuring the same.

At a construction site, an examination is made whether or not a building component, such as a column or a beam constructed in the process of construction.

For example, the following technique is disclosed (see, for example, Japanese Unexamined Patent Publication No. 2005-213972). Specifically, three-dimensional point cloud data of an entire building are measured at a construction site using a three-dimensional laser scanner, and then the measured three-dimensional point cloud data are compared to three-dimensional CAD data by a computer in an office, a workplace, or any other similar place. A deviation generated during construction of the building is then calculated based on the comparison result. A determination is made whether or not the calculated deviation is within an allowable range.

SUMMARY

However, as in the technique disclosed in Japanese Unexamined Patent Publication No. 2005-213972, measuring the three-dimensional point cloud data of the entire building causes the volume of data to be enormous. As a result, the load applied during arithmetic processing becomes excessively high. Further, if, after the measurement of the three-dimensional point cloud data, a deviation is found in the office, the workplace, or any other similar place, which is away from the construction site, the deviation cannot be immediately corrected.

To solve the above-described problem, the present disclosure has been achieved to provide a measurement system, a measurement method, and a measurement program that allow a construction status of each building component be easily determined at a construction site.

Solution to the Problem

In order to achieve the foregoing object, a measurement system according to an aspect of the present disclosure includes: a storage configured to store design information including at least a dimension and a designed position of each of building components at a construction site; a component identifier configured to identify at least one of the building components constructed at the construction site as an identified building component, based on the designed position stored in the storage; a scanner configured to measure a distance and/or angle from the identified building component identified by the component identifier; a point cloud data generator configured to generate three-dimensional point cloud data, based on a result of the distance and/or angle measured by the scanner; and an actually measured position calculator configured to calculate an actually measured position of the identified building component, based on the three-dimensional point cloud data.

The measurement system may further include: an analyzer configured to calculate a deviation between the design information on the identified building component and the actually measured position of the identified building component calculated by the actually measured position calculator.

The measurement system may further include a display controller configured to generate a three-dimensional virtual space display of the construction site, based on the design information stored in the storage.

The measurement system may further include: a camera capable of capturing an actual image. The display controller may generate the virtual space display in a range corresponding to the actual image captured by the camera.

In the measurement system, the scanner may include a deflector including Risley prisms capable of deflecting range-finding light in an optional direction.

In the measurement system, the scanner may measure the distance and/or angle from the identified building component along a scanning trajectory conforming to the shape of the identified building component.

In the measurement system, the scanner may measure the distance and/or angle from the identified building component having an axis, along a scanning trajectory following a contour of a cross section perpendicular to the axis of the identified building component.

In the measurement system, the scanner may measure the distance and/or angle from the identified building component along a scanning trajectory with a fixed resolution on the identified building component.

In the measurement system, the scanner may measure the distance and/or angle from the identified building component along a circular scanning trajectory.

In the measurement system, the scanner may measure the distance and/or angle from the identified building component along a wavy scanning trajectory.

In the measurement system, the scanner may measure the distance and/or angle from the identified building component along a scanning trajectory including the identified building component and its surrounding.

In the measurement system, the component identifier may identify, as the identified building component, one of the building components, the one of the building components being limited based on the designed position stored in the storage.

In the measurement system, the analyzer may generate coloring information on a color for the identified building component, the color corresponding to the deviation calculated.

In order to achieve the foregoing object, a measurement method according to an aspect of the present disclosure includes: identifying at least one of building components constructed at a construction site as an identified building component, based on a designed position of each of the building components stored in a storage storing design information including at least a dimension and the designed position of the building component; scanning the identified building component identified in the identifying through a scanner to measure a distance and/or angle from the identified building component; generating three-dimensional point cloud data, based on a result obtained by measuring the distance and/or angle in the scanning; and calculating an actually measured position of the identified building component, based on the three-dimensional point cloud data, the identifying, the scanning, the generating, and the calculating being performed by a computer.

In order to achieve the foregoing object, a measurement program stored in a storage medium, according to an aspect of the present disclosure, causes a computer to execute: identifying at least one of building components constructed at a construction site as an identified building component, based on a designed position of each of the building components stored in a storage storing design information including at least a dimension and the designed position of the building component; scanning the identified building component identified in the identifying through a scanner to measure a distance and/or angle from the identified building component; generating three-dimensional point cloud data, based on a result obtained by measuring the distance and/or angle in the scanning; and calculating an actually measured position of the identified building component, based on the three-dimensional point cloud data.

According to the present disclosure including the foregoing means, a construction status of each of building components can be easily determined at a construction site.

DETAILED DESCRIPTION

Embodiments of the present disclosure will now be described with reference to the drawings.

Figure 1:
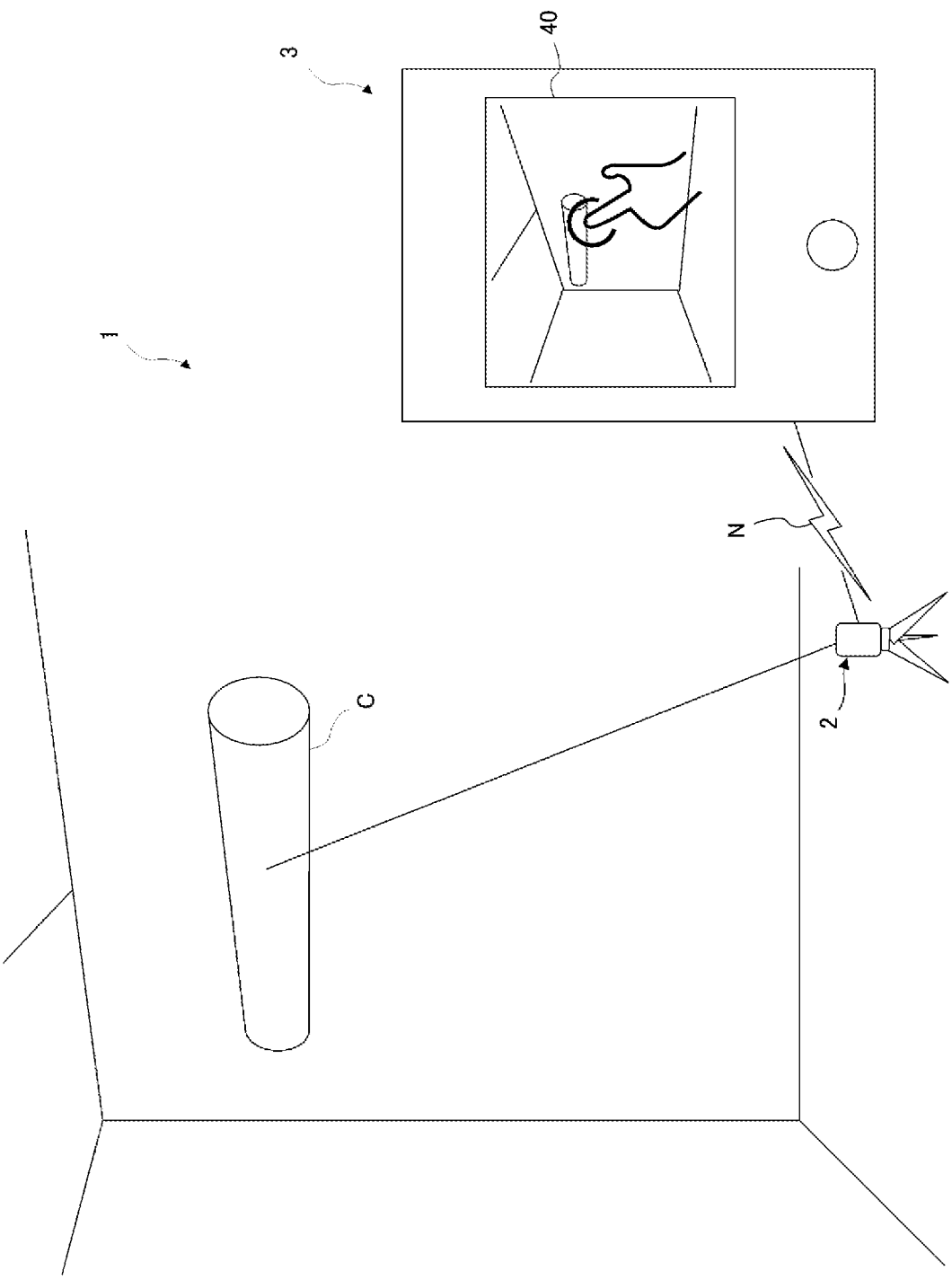
FIG. 1 illustrates a general configuration of a measurement system according to an embodiment of the present disclosure.
Figure 2:
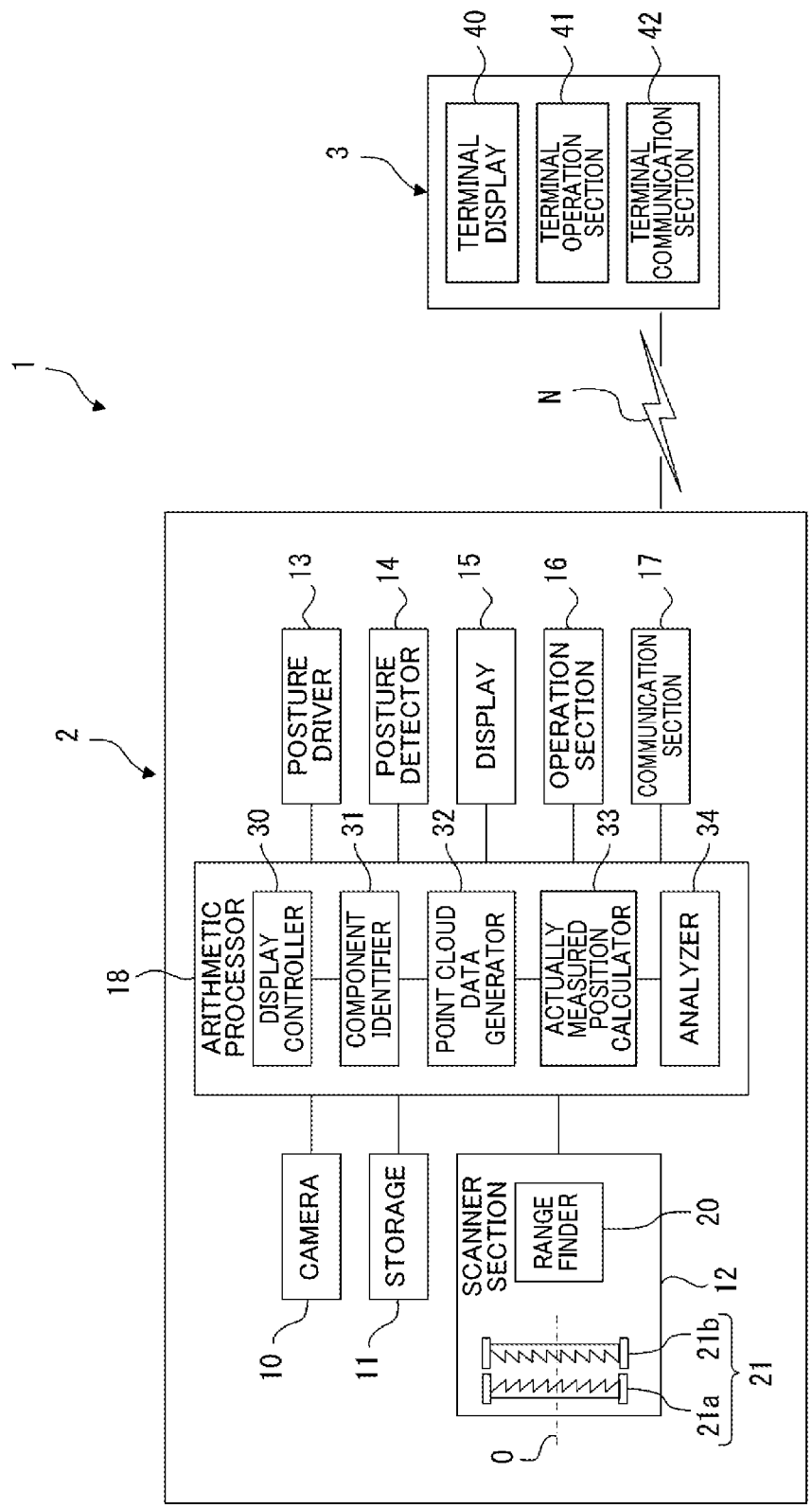
FIG. 2 is a block diagram showing a control system for devices included in the measurement system.

FIG. 1 illustrates a general configuration of a measurement system according to an embodiment of the present disclosure. FIG. 2 is a block diagram showing a control system for devices, i.e., a laser scanner and an information terminal included in the measurement system. The configuration of the measurement system according to this embodiment will now be described with reference to these figures.

First, as illustrated in FIG. 1, a measurement system 1 of this embodiment measures the position of a building component C constructed at a construction site as a measurement target, and analyzes the deviation between the actually measured position and the designed position (hereinafter referred to as an "installation deviation,"). For this purpose, the measurement system 1 includes a measuring instrument 2 and an information terminal 3.

The measuring instrument 2 includes a camera 10, a storage 11, a scanner section 12 (scanner), a posture driver 13, a posture detector 14, a display 15, an operation section 16, a communication section 17, and an arithmetic processor 18, which are electrically connected together.

The camera 10 is a so-called real-time camera that captures an actual image. Specifically, the actual image is captured as a moving image or a still image that is to be regularly updated.

The storage 11 is a memory or a magnetic disk storage device, and stores design information including dimensions and designed arrangement (hereinafter referred to also as the "designed positions") of various building components at a construction site where the measuring instrument 2 is previously installed. As the design information, building information modeling (BIM) is used, and the BIM can include, in addition to the dimensions and designed arrangement of the building components, various pieces of information, such as types (e.g., a steel frame or a pipe), quantities, colors, and makers of the building components, and information on a building constructed using the building components. The design information is not limited to the BIM, and may be three-dimensional CAD data including, for example, the dimensions and designed arrangement of the building components.

The scanner section 12 is a laser scanner including Risley prisms, and includes a range finder 20 and a deflector 21. The range finder 20 functions to irradiate a target with laser light (i.e., range-finding light) and to receive the reflected light to measure the distance and angle between the target and the range finder 20. Note that the range finder 20 may measure only either the distance or angle.

The deflector 21 is closer to the target than the range finder 20 is, and includes a pair of Risley prisms 21a and 21b. The pair of Risley prisms 21a and 21b each have one uneven surface and the other smooth surface. These uneven surfaces face each other. The pair of Risley prisms 21a and 21b are each provided with a motor. The motor is capable of detecting the rotation angle of the motor (not shown) so that the Risley prisms 21a and 21b can rotate relative to each other around their central axis O. Thus, the pair of Risley prisms 21a and 21b can deflect the range-finding light in an optional direction, and allow the range finder 20 to receive the reflected light returning from the optional direction. Further, detecting the rotation angle of the motor enables detection of the direction in which the target is irradiated with the range-finding light and the direction in which the reflected light is received.

The posture driver 13 is an actuator configured to rotate the camera 10 and the scanner section 12 in the horizontal and vertical directions. Driving the posture driver 13 allows the orientations of the camera 10 and the scanner section 12 to be changed.

The posture detector 14 is a rotation angle sensor (encoder) capable of detecting horizontal and vertical angles at which the camera 10 and the scanner section 12 are driven by the posture driver 13. The posture detector 14 may include a tilt measuring instrument (tilt sensor) configured to detect the tilt angle of the measuring instrument 2. The posture detector 14 is capable of detecting the orientations of the camera 10 and the scanner section 12.

The display 15 is capable of displaying various types of information, such as an actual image captured by the camera 10, a virtual space based on the design information stored in the storage 11, a result of measurement performed by the scanner section 12, and a result of analysis performed by the arithmetic processor 18.

The operation section 16 enables, for example, adjustments and operations, such as capturing an image using the camera 10, performing measurement using the scanner section 12, and driving the posture driver 13. In particular, the operation section 16 according to this embodiment can operate to designate a building component on the actual image captured by the camera 10, or a building component in the virtual space based on the design information stored in the storage 11. Note that the operation section 16 may be a physical button or any other suitable component, or may be a touch screen integrated with the display 15.

The communication section 17 is a communication instrument capable of communicating with at least the information terminal 3. For example, the communication section 17 may be a communication instrument that can be connected to a communications network N, such as the Internet, or a component connected to the information terminal 3 wirelessly or via a wire to communicate with the information terminal 3.

The arithmetic processor 18 is a computer section that executes various types of control in the measuring instrument 2. In particular, the arithmetic processor 18 according to this embodiment includes a display controller 30, a component identifier 31, a point cloud data generator 32, an actually measured position calculator 33, and an analyzer 34 as functioning components. Note that, although not shown, the arithmetic processor 18 has an instrument installation function for positioning the coordinates of the installation position of the measuring instrument 2.

The display controller 30 functions to make the display 15 display the actual image captured by the camera 10, and to generate a three-dimensional virtual space display of a construction site based on the design information stored in the storage 11, and make the display 15 display a range of the virtual space display corresponding to the actual image captured by the camera 10.

Only either the actual image or the virtual space display may be displayed. Alternatively, the actual image and the virtual space display may be displayed while superimposing with each other. Still alternatively, switching may be made between the actual image and the virtual space display. The display controller 30 allows a building component displayed on the actual image or in the virtual space to be displayed such that the building component can be designated. In addition, the display controller 30 functions to make the display 15 display point cloud data generated by the point cloud data generator 32 to be described below, the actually measured position calculated by the actually measured position calculator 33, the result of analysis performed by the analyzer 45, and other suitable data.

The component identifier 31 functions to identify one of the building components corresponding to the building component designated via the operation section 16 (hereinafter referred to as the "identified building component"), based on the design information on the building components stored in the storage 11, to acquire the design information on the identified building component (specifically, the dimensions and installation position) from the storage 11, and to make the scanner section 12 measure the corresponding building component. Based on the design information on the identified building component, the component identifier 31 makes the scanner section 12 measure the distance and angle from the identified building component along the scanning trajectory conforming to the installation position and shape of the identified building component.

The point cloud data generator 32 functions to generate three-dimensional point cloud data from the distances between the scanner section 12 and focus points (forming a point cloud), measured by the scanner section 12, and the horizontal and vertical angles detected by the posture detector 14.

The actually measured position calculator 33 functions to calculate the actually measured position of the identified building component from the three-dimensional point cloud data generated by the point cloud data generator 32.

The analyzer 34 functions to analyze the identified building component, such as to calculate the deviation between the design information on the identified building component and the actually measured position of the identified building component calculated by the actually measured position calculator 33.

The measuring instrument 2 configured in this manner can deliver various types of information to the information terminal 3, and can operate in accordance with an instruction from the information terminal 3.

The information terminal 3 may be a dedicated terminal adapted to the measuring instrument 2, or may be a general-purpose smartphone, tablet personal computer (PC), and any other suitable device on which an application for a measurement system is installed. In one preferred embodiment, in particular, the information terminal 3 is portable so that an operator can view or operate a display while performing operations.

Specifically, the information terminal 3 includes a terminal display 40, a terminal operation section 41, and a terminal communication section 42. These functioning components are substantially the same as the display 15, the operation section 16, and the communication section 17 of the measuring instrument 2, respectively. The information terminal 3 can be operated at a position away from the measuring instrument 2.

That is to say, the terminal display 40 is capable of displaying various types of information, such as the actual image captured by the camera 10 of the measuring instrument 2, the virtual space display based on the design information stored in the storage 11, the result of measurement performed by the scanner section 12, and the result of analysis performed by the analyzer 34.

The terminal operation section 41 enables adjustments and operations, such as capturing an image using the camera 10 of the measuring instrument 2, performing measurement using the scanner section 12, and driving the posture driver 13. In particular, the terminal operation section 41 according to this embodiment can operate to designate a building component on the actual image captured by the camera 10, or a building component in the virtual space based on the design information stored in the storage 11. Note that the terminal operation section 41 may be a physical button or any other suitable component, or may be a touch screen integrated with the terminal display 40.

The terminal communication section 42 is a communication instrument capable of communicating with at least the measuring instrument 2. For example, the terminal communication section 42 may be a communication instrument that can be connected to a communications network N, such as the Internet, or a component connected to the measuring instrument 2 wirelessly or via a wire to communicate with the measuring instrument 2.

The measurement system 1 configured as described above designates the measurement target (i.e., the identified building component) from the actual image or the virtual space display displayed on the display 15 of the measuring instrument 2 or on the terminal display 40 of the information terminal 3, and measures the actually measured position of the identified building component using the scanner section 12. Further, the measurement system 1 can perform analysis, such as calculation of the deviation between the actually measured position and the design information.

Figure 3:
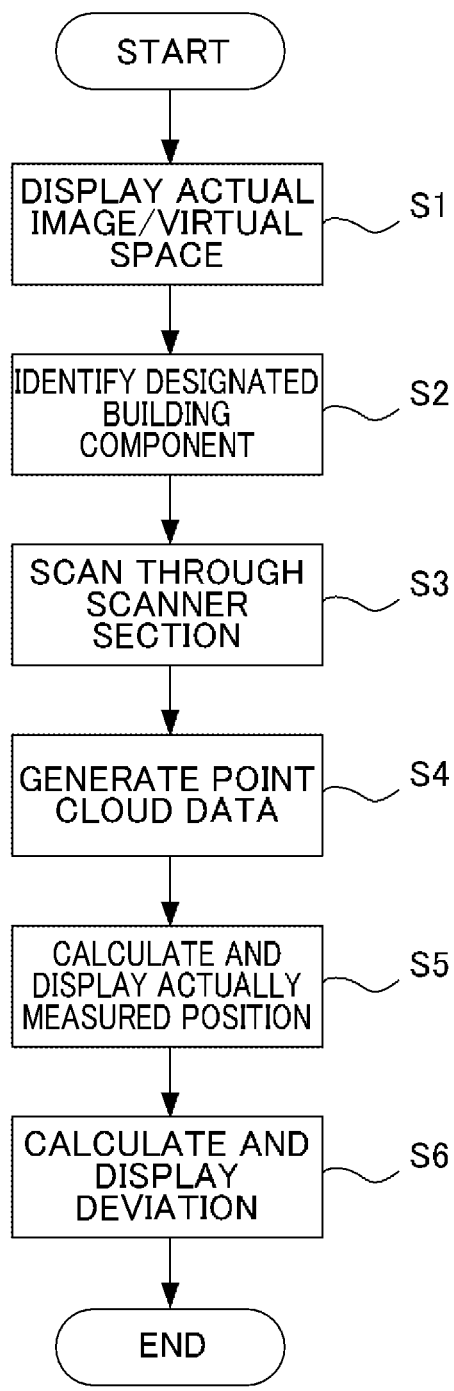
FIG. 3 is a flowchart showing a measurement control routine executed by an arithmetic processor.

Specifically, FIG. 3 is a flowchart showing a measurement control routine executed by the arithmetic processor 18 of the measuring instrument 2 according to this embodiment. The flow of the measurement method according to this embodiment will now be described with reference to the flowchart. Assume that before the start of the measurement control routine, building components have already been constructed, and coordinate alignment (so-called instrument installation) between the actual position of the measuring instrument 2 installed at a construction site and the designed position of the measuring instrument 2 included in the design information has been completed. In the following description, indications are displayed on the display 15 of the measuring instrument 2. Meanwhile, the terminal display 40 of the information terminal 3 is supposed to be in synchronization with the display 15, and to display the same indications as the display 15.

First, in step S1, the display controller 30 of the arithmetic processor 18 makes the display 15 display at least either the actual image captured by the camera 10 or the three-dimensional virtual space display based on the design information stored in the storage 11. While watching this display, an operator designates, via the operation section 16 or the terminal operation section 41, a building component to be examined, for example.

In step S2, the component identifier 31 identifies one of the building components corresponding to the designated building component, based on the design information on the building components stored in the storage 11, and acquires the design information on the identified building component (a component identifying step).

In step S3, based on the design information on the identified building component, the component identifier 31 makes the scanner section 12 measure the distance and angle along a scanning trajectory (trajectories) conforming to the shape of the identified building component (a scanning step).

Then, in step S4, the point cloud data generator 32 generates three-dimensional point cloud data from the distances between the scanner section 12 and focus points (forming a point cloud), measured by the scanner section 12, and the horizontal and vertical angles detected by the posture detector 14 (a point cloud generating step).

Next, in step S5, the actually measured position calculator 33 calculates the actually measured position of the identified building component from the three-dimensional point cloud data generated in step S4, and the display controller 30 makes the display 15 display the calculated actually measured position of the identified building component (an actually measured position calculating step).

In step S6, the analyzer 34 calculates the deviation between the design information on the identified building component and the actually measured position of the identified building component calculated in step S5, and the display controller 30 makes the display 15 display information on the calculated deviation, and finishes the routine (an analyzing step).

Figure 4:
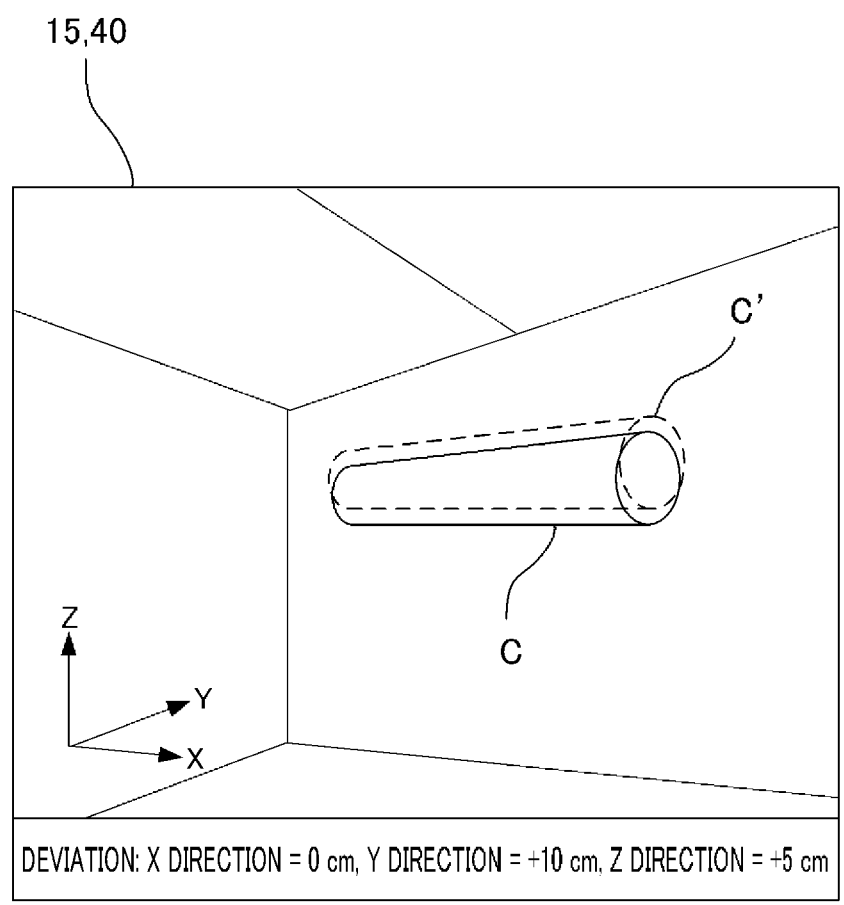
FIG. 4 illustrates a display example of an actually measured position and deviation information displayed on a display of a measuring instrument or a terminal display.

Here, FIG. 4 illustrates a display example of the actually measured position and deviation information displayed on the display 15 of the measuring instrument 2 or the terminal display 40. Advantages of this embodiment will now be described with reference to this figure.

In this figure, a screen of the display 15 or the terminal display 40 indicates, by the solid line, an identified building component C based on the design information, on the actual image captured by the camera 10 or in the virtual space based on the design information. Since design information including the dimensions and designed positions of building components displayed on the screen is prepared, the operator can easily identify a building component to be measured by designating one of the building components displayed on the screen.

The screen further indicates, by the dotted line, the actually measured position of an identified building component C' based on the three-dimensional point cloud data measured by the scanner section 12. As can be seen, the deviation of the identified building component can be intuitively determined from the degree of misalignment between the identified building component C indicated by the solid line and the identified building component C' indicated by the dotted line. A lower portion of the screen further shows the deviation information calculated by the analyzer 34 such as the deviations in the X, Y, and Z directions being 0 cm, +10 cm, and +5 cm, respectively. Thus, the deviations can be more quantitatively determined.

Since the screen shows the virtual space display generated in a range corresponding to the actual image captured by the camera 10, the virtual space display can also be changed in accordance with a change in the orientation of the camera 10 (i.e., the posture of the measuring instrument 2). Thus, the operator can search easily for a building component to be measured.

Based on the design information on the identified building component, the component identifier 31 makes the scanner section 12 measure the distance and angle along the scanning trajectory (trajectories) conforming to the shape of the corresponding identified building component. Thus, irrespective of the positional relationship between the measuring instrument 2 and the identified building component, point cloud data with high accuracy can be efficiently generated.

Here, FIGS. 5A to 8B each show a specific example of a scanning trajectory (trajectories) conforming to the shape of an identified building component.

Figure 5A:
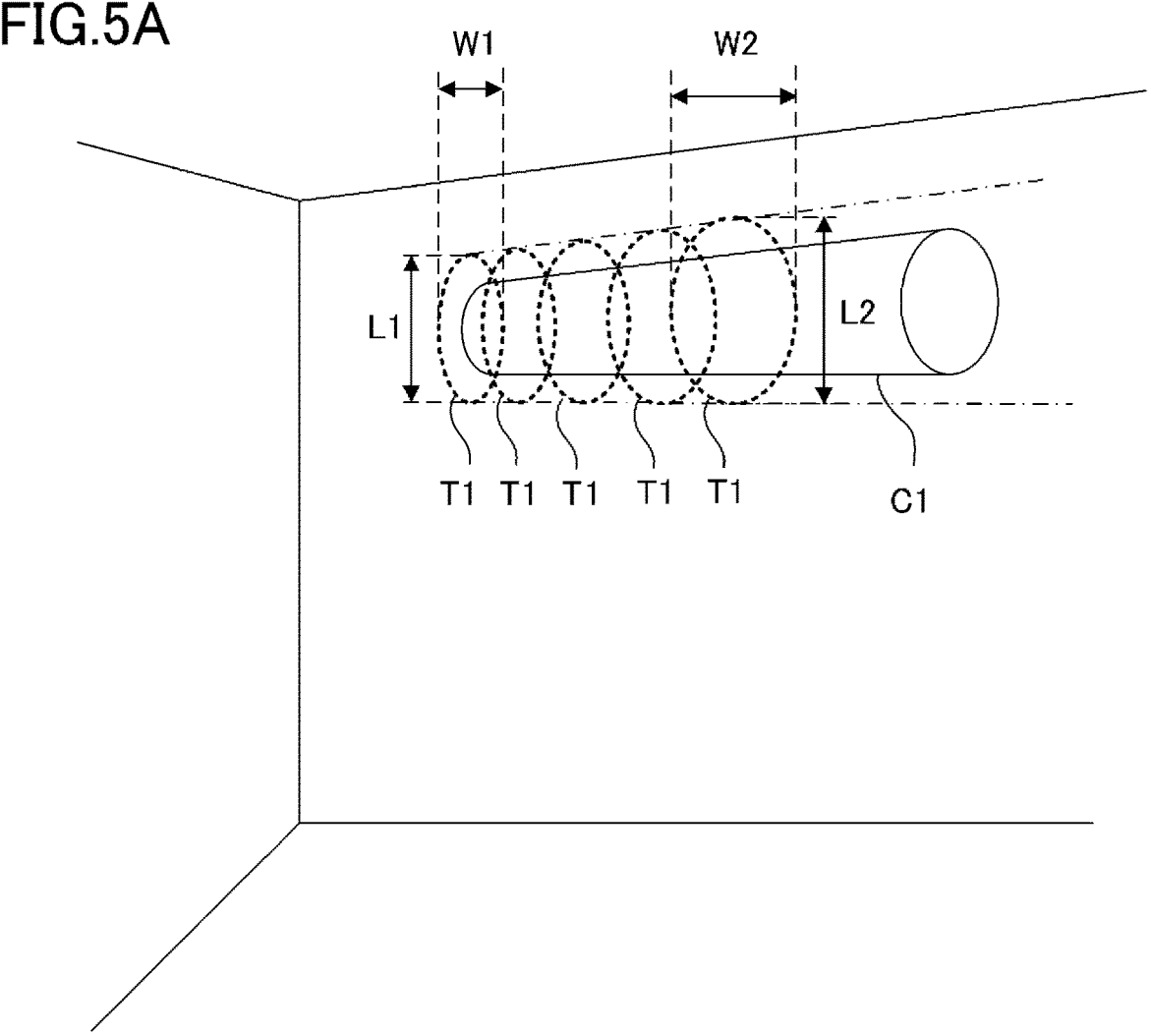
FIG. 5A illustrates exemplary scanning trajectories along which an identified building component is scanned, as viewed from a camera.
Figure 5B:
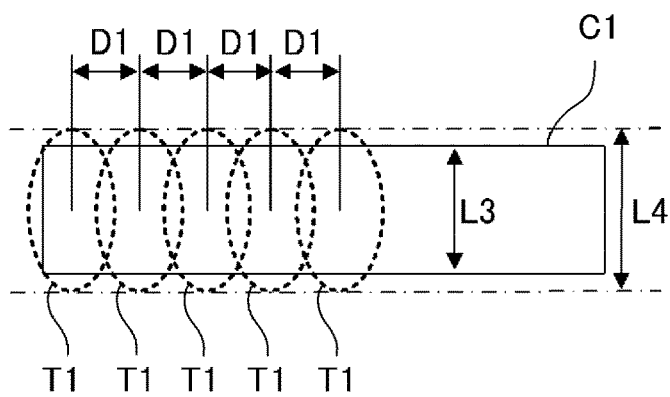
FIG. 5B illustrates exemplary scanning trajectories on the identified building component.

First, FIGS. 5A and 5B illustrate an example in which the distance and angle are measured along elliptical scanning trajectories. FIG. 5A illustrates exemplary scanning trajectories along which an identified building component is scanned, as viewed from the camera 10. FIG. 5B illustrates exemplary scanning trajectories on the identified building component.

In FIGS. 5A and 5B, the component identifier 31 uses the scanner section 12 to measure the distance and angle from the identified building component C1 along scanning trajectories T1 forming of the respective ellipses arranged along the axial direction. The identified building component C1 is a circular cylindrical beam. As can be seen, if the scanning trajectories T1 are circular, the scanner section 12 that relatively rotates the pair of Risley prisms 21a and 21b around the central axis O to deflect the range-finding light can perform efficient scanning without being uselessly driven.

As illustrated in FIG. 5A, display is implemented such that a portion of the identified building component C1 (i.e., the circular cylindrical beam) closer to the measuring instrument 2 looks larger, and a portion thereof remote from the measuring instrument 2 looks smaller, on the actual image captured by the camera 10 or in the virtual space based on the design information. Meanwhile, the component identifier 31 calculates the relative positional relationship (distance, angle) between the position of the measuring instrument 2 and the position of the identified building component C1, based on the design information on the identified building component C1.

Then, the component identifier 31 corrects the scanning trajectories, based on the calculated relative positional relationship, and uses the scanner section 12 to measure the distance and angle along the scanning trajectories T1. The scanning trajectories T1 form the respective ellipses arranged at regular intervals D1 (e.g., the intervals between the centers of the ellipses) on the identified building component C1 in a front view of the identified building component as illustrated in FIG. 5B. In this manner, the scanner section 12 measures the distance and angle along the scanning trajectories arranged at regular intervals with a fixed resolution on the identified building component C1.

Thus, as shown in FIG. 5A, the scanning trajectories are drawn as apparently smaller ellipses (having a minor axis W1 and a major axis L1) on the far side of the actual image or the virtual space and as apparently larger ellipses (having a minor axis W2 and a major axis L2) on the near side of the actual image or the virtual space. In FIG. 5A, the intervals between the ellipses gradually increase from the far side toward the near side.

As can be seen, the scanner section 12 measures the distance and angle, in accordance with the shape of the identified building component C1, along the elliptical scanning trajectories T1 arranged at regular intervals in the axial direction on the identified building component C1. Thus, the identified building component C1 can be measured with a fixed resolution without any bias. This allows the point cloud data on the identified building component C1 to be accurately and efficiently acquired.

As illustrated in FIGS. 5A and 5B, the component identifier 31 uses the scanner section 12 to measure the distance and angle along the scanning trajectories T1 including the identified building component C1 and its surrounding. In other words, as shown in FIG. 5B, the length L4 of the major axis of each of the ellipses as the scanning trajectories is greater than the diameter L3 of the identified building component C1. Thus, even if the installation position of the identified building component C1 is slightly shifted, it can fall within the range where the distance and angle can be measured.

Figure 6A:
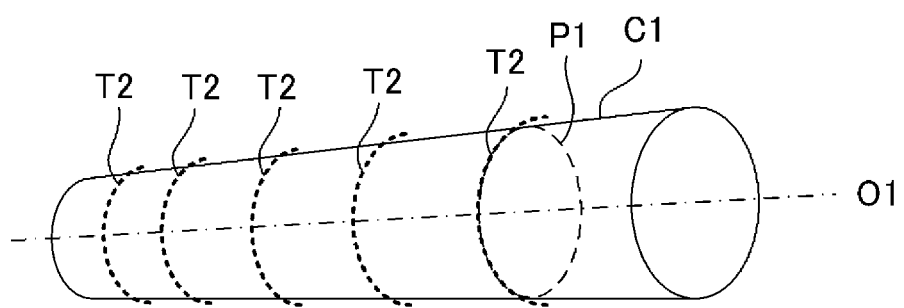
FIG. 6A illustrates exemplary scanning trajectories following a contour of a cross section perpendicular to the axis of a circular cylindrical identified building component C1.
Figure 6B:
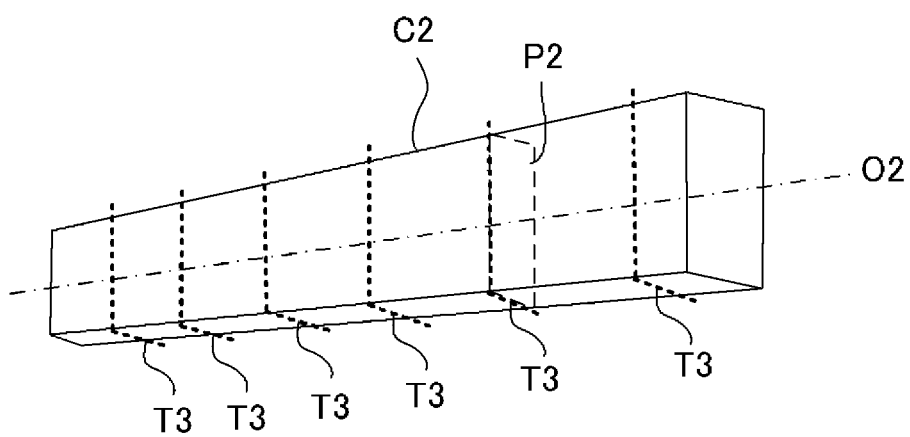
FIG. 6B illustrates exemplary scanning trajectories following a contour of a cross section perpendicular to the axis of a prism-shaped identified building component C2.

Next, FIGS. 6A and 6B illustrate exemplary scanning trajectories following a contour of a cross section perpendicular to the axis of an identified building component. Specifically, FIG. 6A illustrates exemplary scanning trajectories following a contour of a cross section perpendicular to the axis of a cylindrical identified building component C1, and FIG. 6B illustrates exemplary scanning trajectories following a contour of a cross section perpendicular to the axis of a prism-shaped identified building component C2.

In FIG. 6A, the component identifier 31 uses the scanner section 12 to measure the distance and angle along arc-shaped scanning trajectories T2 following a contour of a cross section P1 perpendicular to the axis O1 of the cylindrical identified building component C1 as viewed from the camera 10.

In FIG. 6B, if the identified building component C2 is prism-shaped, and has a rectangular cross section, the component identifier 31 uses the scanner section 12 to measure the distance and angle along L-shaped scanning trajectories T3 following a contour of a cross section P2 perpendicular to the axis O2 of the identified building component C2.

Portions of the surfaces of the identified building components C1 and C2 visible from the camera 10 (strictly, scannable by the scanner section 12) are each measured in distance and angle along an associated one of the scanning trajectories T2 and T3 respectively shown in FIGS. 6A and 6B. The portions of the surfaces each correspond to a portion of the entire contour of the cross section P1, P2 perpendicular to the associated axis O1, O2 of the associated identified building component C1, C2. Further, the scanning trajectories T2 and T3 each extend to an area where the contour of an associated one of the cross sections P1 and P2 is extended, such that even if the installation positions of the identified building components C1 and C2 are slightly shifted, they can fall within the range where the distance and angle can be measured.

As can be seen, the identified building components C1 and C2 respectively having the axes O1 and O2 are each measured in distance and angle along associated ones of the scanning trajectories T2 and T3 following a contour of the associated cross section P1, P2 perpendicular to the associated axis O1, O2 of the associated specified building component C1, C2. This allows an effective point cloud to be acquired through a few times of scanning.

The intervals between adjacent ones of the associated scanning trajectories T2, T3 apparently gradually increase from the far side toward the near side of FIGS. 6A and 6B. Actually, in each of the situations shown in FIGS. 6A and 6B, the associated scanning trajectories T2, T3 are arranged at regular intervals along the associated axis O1, O2 of the associated identified building component C1, C2. The component identifier 31 extends the scanning trajectories T2, T3 beyond the peripheral surfaces, in design, of the identified building components C1 and C2 visible from the camera 10 so that the installation positions of the identified building components C1 and C2 may be slightly shifted from the respective designed positions.

Figure 7A:
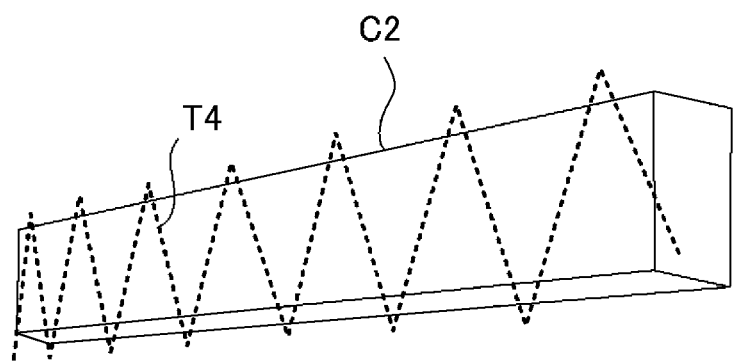
FIG. 7A illustrates an exemplary scanning trajectory with a triangular waveform.
Figure 7B:
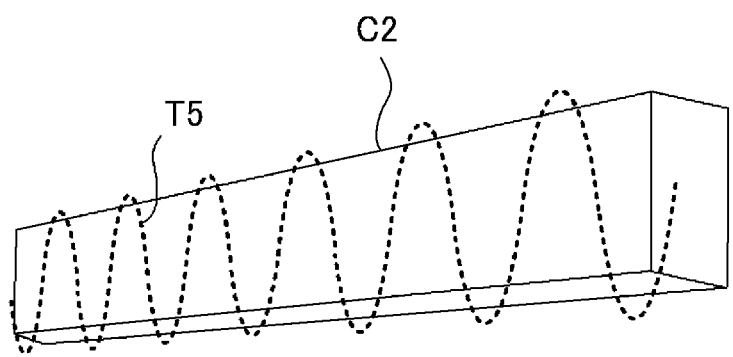
FIG. 7B illustrates an exemplary scanning trajectory with a sinusoidal waveform.

FIGS. 7A and 7B each illustrate an exemplary wavy scanning trajectory. Specifically, FIG. 7A illustrates an exemplary scanning trajectory with a triangular waveform, and FIG. 7B illustrates an exemplary scanning trajectory with a sinusoidal waveform. The identified building component shown in FIGS. 7A and 7B is a prism-shaped identified building component C2, just like that shown in FIG. 6B.

In FIG. 7A, the component identifier 31 uses the scanner section 12 to measure the distance and angle from a side surface of the identified building component C2 having the largest area as viewed from the camera 10, along a scanning trajectory T4 with a triangular waveform parallel to the axis of the identified building component C2.

In FIG. 7B, the component identifier 31 uses the scanner section 12 to measure the distance and angle from a side surface of the identified building component C2 having the largest area as viewed from the camera 10, along a scanning trajectory T5 with a sinusoidal waveform parallel to the axis of the identified building component C2.

The cycles of the scanning trajectories T4 and T5 apparently gradually increase from the far side toward the near side of FIGS. 7A and 7B. Actually, in the situations shown in FIGS. 7A and 7B, the cycles of the scanning trajectories T4 and T5 along the axis of the identified building component C2 are equal. In order that the installation position of the identified building component C2 may be slightly shifted from the designed position thereof, the component identifier 31 allows the amplitude of each of the scanning trajectories T4, T5 to be greater than the length, in design, of the short side of the side surface of the identified building component C2 visible from the camera 10, and allows the length of the waveform to be greater than the length, in design, of the long side of the side surface.

Using such a wavy scanning trajectory allows a point cloud on one surface of an identified building component to be efficiently acquired. The wavy scanning trajectories with a triangular waveform and a sinusoidal waveform are merely examples. The wavy scanning trajectories may have any other waveform, such as a rectangular waveform.

Figure 8A:
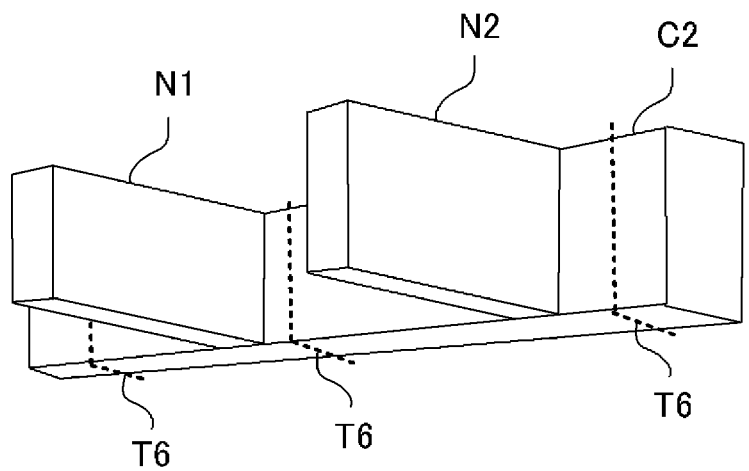
FIG. 8A illustrates a first example of scanning trajectories along which the identified building component partially covered with objects that do not need to be measured is scanned, as viewed from the camera.
Figure 8B:
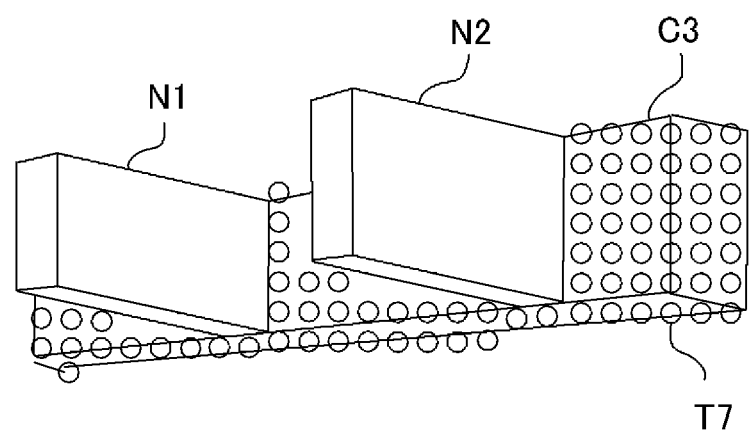
FIG. 8B illustrates a second example of other scanning trajectories along which the identified building component partially covered with the objects that do not need to be measured is scanned, as viewed from the camera.

Further, FIG. 8A illustrates a first example of scanning trajectories along which an identified building component covered with objects that do not need to be measured is scanned, as viewed from the camera 10. FIG. 8B illustrates a second example of the scanning trajectories.

In FIGS. 8A and 8B, two building components N1 and N2 forming rectangular prism-shaped objects that do not need to be measured are connected to a side surface of the prism-shaped identified building component C2 shown in FIGS. 6B, 7A, and 7B. When viewed from the camera 10, the identified building component C2 are partially hidden by the building components N1 and N2.

To address this problem, in FIG. 8A, the component identifier 31 uses the scanner section 12 to measure the distance and angle from portions of the identified building component C2 not hidden by the building components N1 and N2, i.e., portions thereof exposed from the camera 10, along L-shaped scanning trajectories T6 following a contour of a cross section perpendicular to the axis of the identified building component C2.

In FIG. 8B, the scanner section 12 measures the distance and angle from portions of the identified building component C2 not hidden by the building components N1 and N2 along a plurality of small circular scanning trajectories T7. FIG. 8B illustrates small circles regularly spaced apart from one another. However, the arrangement of the small circles is merely an example. For example, scanning may be performed, for example, along small circles that are successively or irregularly arranged.

As described above, even if the identified building component C2 is partially hidden by the building components N1 and N2 serving as the objects that do not need to be measured, the identified building component C2 is measured in distance and angle along scanning trajectories having a shape that allows the actually measured position of the identified building component C2 to be calculated in accordance with exposed portions of the identified building component C2. Thus, even if the identified building component C2 is partially hidden as viewed from the camera 10, the actually measured position of the identified building component C2 can be calculated.

One embodiment of the present disclosure has been described above. However, an aspect of the present disclosure is not limited to the foregoing embodiment.

For example, in the foregoing embodiment, the scanner section 12 is a laser scanner including Risley prisms, but may be a different type of laser scanner.

In the foregoing embodiment, the component identifier 31 designates one of building components as an identified building component. However, the number of identified building components to be measured is not limited to one, and may be two or more. For example, a designated one of the identified building components to be measured may be limited based on the design information indicating the types of the building components, such as "pipes," "plates," and "H steels," and the installation positions of the building components, such as the floor and a specific room. This can improve the retrieval performance of the building components to be measured, and allows two or more of the building components to be designated at the same time. Thus, the construction status for each of the building components can be more efficiently checked.

In the foregoing embodiment, as shown in FIG. 4, the deviation information calculated by the analyzer 34 is displayed, as numerical values, on the screen. However, the way of indicating the deviation information is merely an example. For example, the state where an identified building component is colored, such as the state shown in a heat map, may indicate the deviation. In other words, the analyzer generates coloring information on a color for an identified building component, the color corresponding to the calculated deviation, and the display controller performs display corresponding to the coloring information. For example, if the actually measured position of a portion of the identified building component matches an associated designed value, this portion is not colored; if the actually measured position of another portion of the identified building component is slightly different from an associated designed value, this another portion is colored with blue; and as the difference between the actually measured position and the designed value is greater, the color is getting red. Thus, the deviation can be more intuitively determined.

In the foregoing embodiment, a situation where the measuring instrument 2 is installed at one position within a construction site to measure the actually measured position of the identified building component. However, results of measuring the actually measured position of an identified building component from a plurality of locations through a measuring instrument may be synthesized to calculate the actually measured position of the identified building component or to analyze the installation deviation.

Further, in the foregoing embodiment, the components of the measuring instrument 2 do not necessarily have to be included in the measuring instrument, and some of the components may be included in an information terminal or another device. For example, the information terminal may include the storage storing the design information. Alternatively, a storage of the cloud may be used. Instead of the arithmetic processor, another arithmetic processor included in an information terminal may also be used. Further, the measuring instrument does not necessarily have to include a posture driver.

What is claimed is:

1. A measurement system comprising:
   a display controller configured to display an actual image or a virtual image in a construction site so that a user can designate at least one of a plurality of building components in the construction site;
   a storage configured to store design information including at least a dimension and a designed position of each of the plurality of building components at the construction site;
   a component identifier configured to identify the at least one of the plurality of building components constructed at the construction site as an identified building component, based on the design information, including the dimension, and the designed position stored in the storage, and configured to acquire the design information, including the dimension, and the design position of the identified building component from the storage;
a scanner configured to measure a distance and/or angle from the identified building component identified by the component identifier, based on the design information of the identified construction component;
a point cloud data generator configured to generate three-dimensional point cloud data, based on a result of the distance and/or angle measured by the scanner; and
an actually measured position calculator configured to calculate an actually measured position of the identified building component, based on the three-dimensional point cloud data.

2. The measurement system of claim 1 further comprising:
an analyzer configured to calculate a deviation between the design information of the identified building component and the actually measured position of the identified building component calculated by the actually measured position calculator.

3. The measurement system of claim 2, wherein the analyzer generates coloring information of a color for the identified building component, the color corresponding to the deviation calculated.

4. The measurement system of claim 1 further comprising:
a camera capable of capturing an actual image, wherein the display controller generates the virtual image in a range corresponding to the actual image captured by the camera.

5. The measurement system of claim 1, wherein the scanner includes a deflector including Risley prisms capable of deflecting range-finding light in an optional direction.

6. The measurement system of claim 1, wherein the scanner measures the distance and/or angle from the identified building component along a scanning trajectory conforming to a shape of the identified building component.

7. The measurement system of claim 6, wherein the scanner measures the distance and/or angle from the identified building component having an axis, along a scanning trajectory following a contour of a cross section perpendicular to the axis of the identified building component.

8. The measurement system of claim 6, wherein the scanner measures the distance and/or angle from the identified building component along a scanning trajectory with a fixed resolution on the identified building component.

9. The measurement system of claim 6, wherein the scanner measures the distance and/or angle from the identified building component along a circular scanning trajectory.

10. The measurement system of claim 6, wherein the scanner measures the distance and/or angle from the identified building component along a scanning trajectory forming a waveform.

11. The measurement system of claim 6, wherein the scanner measures the distance and/or the angle from the identified building component along a scanning trajectory including the identified building component and its surroundings.

12. The measurement system of claim 1, wherein the component identifier identifies the identified building component based on the designed position stored in the storage.

13. A measurement method comprising:
displaying an actual image or a virtual image in a construction site so that a user can designate at least one of a plurality of building components in the construction site;
identifying the at least one of the plurality of building components constructed at a construction site, designated by the user, as the identified building component, based on design information, including a dimension, and a designed position of each of the plurality of building components stored in a storage, the storage storing the design information including the dimension and the designed position of the building component, and acquiring the design information, including the dimension, and the design position of the identified building component from the storage;
scanning the identified building component through a scanner based on the design information of the identified construction component to measure a distance and/or angle from the identified building component;
generating three-dimensional point cloud data based on a result obtained by measuring the distance and/or angle in the scanning; and
calculating an actually measured position of the identified building component based on the three-dimensional point cloud data, wherein the displaying, the identifying, the scanning, the generating, and the calculating is performed by a computer.

14. A storage medium storing a measurement program, the storage medium causing a computer to execute:
displaying an actual image or a virtual image in a construction site so that a user can designate at least one of a plurality of building components in the construction site;
identifying the at least one of a plurality of building components constructed at the construction site, designated by the user, as an identified building component based on design information, including a dimension, and a designed position of each of the plurality of building components stored in a storage, the storage storing the design information including the dimension and the designed position of the building component, and acquiring the design information, including the dimension, and the design position of the identified building component from the storage;
scanning the identified building component through a scanner based on the design information of the identified construction component to measure a distance and/or angle from the identified building component;
generating three-dimensional point cloud data based on a result obtained by measuring the distance and/or angle in the scanning; and
calculating an actually measured position of the identified building component based on the three-dimensional point cloud data.

* * * * *